United States Patent [19]
Schaeffer et al.

[11] Patent Number: 5,266,379
[45] Date of Patent: Nov. 30, 1993

[54] TETRAHEDRON FILLED PANELS

[76] Inventors: Bernarr C. Schaeffer; Bernarr E. Schaeffer; James P. Schaeffer, all of 129 Lawrenceville Rd., Rosendale, N.Y. 12472; Wayne Schaeffer, Box 467 B-2, Stone Ridge, N.Y. 12484

[21] Appl. No.: 670,012

[22] Filed: Mar. 15, 1991

[51] Int. Cl.$^5$ .............................. B32B 1/00; B32B 3/12
[52] U.S. Cl. ..................................... 428/178; 428/174; 428/120; 52/785; 52/806; 52/808
[58] Field of Search ................... 428/174, 178, 76, 72, 428/68, 120, 179, 188, 192, 156, 542, 8; 52/785, 792, 793, 806, 808, 814

[56] References Cited

U.S. PATENT DOCUMENTS 3,642,566  2/1972  Figge ................................. 428/128
3,742,663  7/1973  Duskin ............................... 428/178

Primary Examiner—Donald J. Loney
Attorney, Agent, or Firm—Joseph B. Taphorn

[57] ABSTRACT

A sandwich panel has a core formed of a plastic sheet having columns of equally spaced points displaced from one side, and other columns of similarly spaced points displaced from the other side, the columns on the two sides being interleaved and the points in adjacent columns on the same side being staggered, with the points in the other-side columns being disposed in rows with the oncoming one side column. The displaced points on a side form somehat cone-like structures which intersect the cone-like structures formed by displaced points on the other side to form structures constituting tetrahedrons and octahedrons when assembled and cemented between the layers of a panel. An apparatus and method for forming the core from a heated plastic sheet, involve passing the sheet between two rollers having projections which displace the points to each side. Another apparatus and method involve forming core shapes over stationary projections. Complex and compound structures may be created. Tetrahedron sandwich panels may also be formed by displacing core material from material which will constitute outside layers.

3 Claims, 8 Drawing Sheets

TETRAHEDRON FILLED PANELS

INTRODUCTION

1. Field of the Invention

This invention relates to sandwich type structural panels consisting of two spaced layers interconnected by a three-dimensional core, and more particularly, to such panels fabricated with a three-dimensional core of plastic (any deformable material) embodying constructs of tetrahedrons and octahedrons in a modularly repeated pattern forming a complementary space-filling matrix that is an octet truss.

2. Description of Earlier Information

A sandwich panel embodying a three-dimensional core constituting a deformed plastic sheet is disclosed in co-pending patent application "Lightweight Sandwich Panel", Ser. No. 07/478,281, filed Feb. 2, 1990 by Bernarr C. Schaeffer now U.S. Pat. No. 5,182,158. Therein, a plastic sheet is vacuum formed to have truncated cones whose reduced-end flat surfaces are cemented to one outer layer, whereas the unformed portions of the sheet are secured to the other outer layer, to form a lightweight but strong panel.

SUMMARY OF THE INVENTION

It has been discovered that panels of the earlier Bernarr C. Schaeffer invention can be made even stronger by employing omni-triangulated polyhedra, the tetrahedron and the octrahedron, exclusively throughout the construction. Using a matrix consisting of only the triangulated, structurally stable tetrahedra and octahedra in a complementary space-filling arrangement, places material along optimal energy resisting and intersharing vectors. The interplaced tetrahedron and octahedron structures provide for maximum sharing of stress.

Accordingly, it is an object of the invention to make lightweight panels of even stronger construction.

Another object of the invention is to provide a lightweight panel having a core which when fixed to the outside layers forms tetrahedron and octahedron structures resulting in a panel that is much stronger than heretofore thought possible.

A further object of the invention is to provide a lightweight panel having tetrahedron and octahedron structures wherein the core can be a deformed plastic sheet.

Still another object of the invention is to provide a stronger lightweight panel that is simple of construction and easy of manufacture, and one whose parameters can be computer controlled.

Yet another object of the invention is to provide methods and apparatuses for deforming a plastic sheet to create tetrahedron and octahedron structures in a panel embodying it, and that lend themselves to computer control to provide for different properties in the panels or their portions.

These and other objects of the invention are achieved by deforming a plastic sheet so that it incorporates raised and/or lowered points which when secured to the outer layers of a panel, form adjoining, overlapping, and interplaced tetrahedron and octahedron structures. (Tetrahedron structures are the most economical and stable structures known to man, being the four-sided counterpart of the inherently stable planar triangle and the basic atomic and cellular structure throughout nature.) Adjoining and overlapping tetrahedron structures, and adjoining octahedron structures, enable the maximal sharing of stress by and between the inherently rigid tetrahedron ones, and hence impart great structural advantage, allowing lighter materials to handle greater loads.

Tetrahedron shapes may be created by raising (and/or lowering) triangularly spaced points on a side of the plastic sheet and lowering (and/or raising) an intermediate point on the other side; a tetrahedron structure in the assembled panel being defined by the intermediate point of the plastic sheet as the lower apex and the three circumscribing raised triangularly spaced points as the other apexes, with the four faces of the tetrahedron being the embraced portion of the upper outer layer cemented to the three raised points and the three plastic sheet portions interconnecting the intermediate point with line segments between each of the three triangularly spaced points. Inverse tetrahedra are formed sharing edges with the regular tetrahedra and having their three spaced points cemented to the lower layer. Sets of triangularly spaced points are created by staggering the points in alternate columns. Sets of intermediate points are created by staggering them in alternate columns interleaved with the spaced-points columns and aligning them row-wise with spaced points in the on-coming columns.

Thus a feature of the invention is that the plastic sheet can be deformed to both of its sides, so that when assembled between two outside layers, tetrahedron and adjoining octahedron structures are defined. The desirable shape is created by simply lowering (or raising) a point along one side of each point in columns of raised (or lowered) points, in the space between the adjacent columns of the raised (or lowered) points. Thus sets of three raised (or lowered) points on one side are arranged around lowered (or raised) points on the other side. A point on the other side constitutes one apex of the tetrahedron and the three points on the one side the other apexes, with the four faces being the three side wall plastic sheet portions interconnecting line segments joining the three points with the point on the other side and the outer panel portion attached to the three points on the one side.

Adjoining tetrahedrons obtain in that each of the three points on one side of a sheet forms the apex of an inverse tetrahedron having its other three apexes on the other side. These inverse tetrahedrons lie on one hundred and twenty degrees (120*) centers about the central tetrahedron. Stated otherwise, each side edge (intersection of two adjacent side wall plastic sheet portions or faces, and being a line segment joining one point on the other side with one of the three points on the other) forms the side edge of a tetrahedron having its one apex on the one side. Thus each regular tetrahedron has each of its side edges being in common with an inverse tetrahedron to form an extraordinarily strong structure.

A regular tetrahedron and the three inverse tetrahedrons about it are locked in place by the octahedron structures partially about them. Thus the outer faces of a regular tetrahedron respectively form faces with three octahedrons each sharing two faces with adjoining inverse tetrahedrons. In this way the entire matrix of tetrahedrons and octahedrons are secured in one rigid force resistant structure.

Plastic sheets can be deformed according to applicant's invention by conventional vacuum forming or extrusion operations. However applicant has discovered that they can be more easily and economically formed by passing a heated plastic sheet between two synchronized movable endless surfaces bearing with protruding pins. The pins are so arranged on the endless surfaces as to displace the desired triangularly spaced points on both sides of the sheet.

An advantage of the invention is that extraordinary resistance to deflection obtains in the panels, the tetrahedrons and octahedrons acting to distribute a point load over very large areas.

BRIEF DESCRIPTION OF THE DRAWINGS

These and other objects, features and advantages of the invention will become apparent from a reading of the following description, when considered with the appended drawings wherein.

DETAILED DESCRIPTION OF EMBODIMENT

Figure 1:
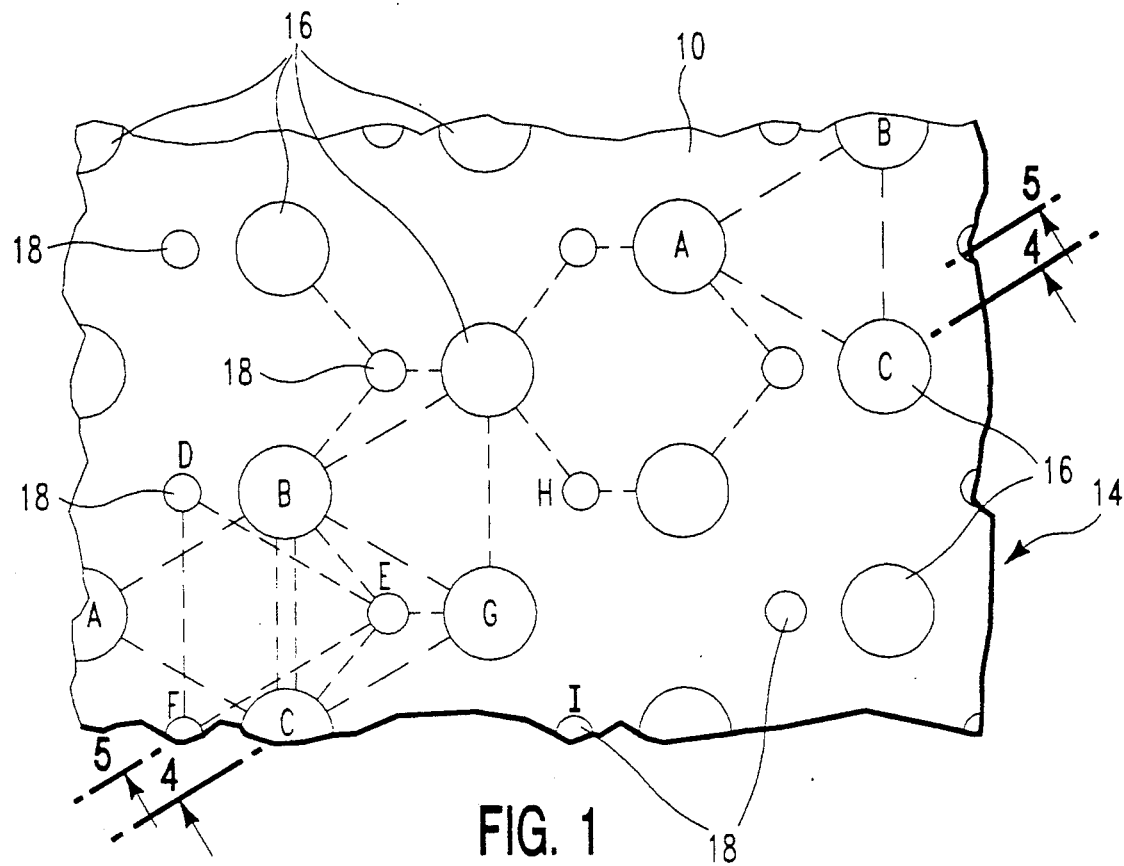
FIG. 1 is a schematic view, partially exploded, of geometric principles employed in the invention.

Referring now to the drawings, FIG. 1 shows in schematic form the geometric principles employed in a sandwich panel fabricated according to the invention. A matrix of regular tetrahedra "T" has their bases in the upper surface and their opposite apexes or vertices in the lower surface. Inverse tetrahedra "IT" of equal size have their bases in the lower surface and their opposite vertexes in the upper surface. The tetrahedra share their internal edges formed by their equal-sized faces with adjacent tetrahedra of the opposite orientation; it results that a first regular tetrahedron is surrounded by and adjoins edge-wise three tetrahedra of the opposite orientation, and that pairs of the adjoining tetrahedra of the opposite orientation respectively share their two other adjacent edges with two regular tetrahedra having edges with an inverse tetrahedron. The space inbetween the first tetrahedron, two adjoining tetrahedra of the opposite orientation, the two regular tetrahedra having edges in common with an inverse tetrahedron, is bounded by an octahedron such as shown exploded at the right hand end of FIG. 1 and labeled "O".

FIG. 1 shows that each tetrahedron is surrounded by three octahedron. The common edge that a regular tetrahedron "T" shares with an inverse tetrahedron "IT" is shown at the front of FIG. 1. Structures embodying regular tetrahedra and octahedra are known and have been called "octet trusses".

Referring now to FIGS. 2-7 of the drawings, a panel is shown as including upper and lower clear layers 10 and 12 and a core generally indicated by the number 14. The layers 10 and 12 need not be clear, that is, transparent; they are employed here to facilitate showing the principles of the invention.

The core 14 is formed out of a plastic sheet. Vertical columns (FIG. 2) of conically shaped protrusions 16 are formed on the upper side of the sheet core 10, the protrusions 16 in adjacent columns being staggered. Similar columns of conically shaped protrusions 18 are formed on the lower side of the sheet core 10, the protrusions 18 in adjacent columns being staggered. The free ends of the protrusions are flat and cemented to the outer layers 10 and 12. (The free ends need not be flat; and they may be conformed to the curvature of the outer layer.)

The columns of the lower protrusions 18 are formed intermediate the columns of the upper protrusions 16, with the lower protrusions 18 being aligned row-wise with the upper protrusions 16 in the oncoming column of them. (In FIG. 1, the ends of the upper protrusion 16 appear larger than the ends of the lower protrusions 18 because the outside diameters of the former are seen therein, while only the inside diameters of the lower ones are visible from above.)

The top surfaces of the upper protrusions 16 and the bottom surfaces of the lower protrusions 18 are wetted with any of a number of appropriate commercially available cements to rigidly fix them upon drying respectively to the upper and lower plastic layers 10 and 12 to form the unique panel having geometries imparting great strength.

Figure 2:
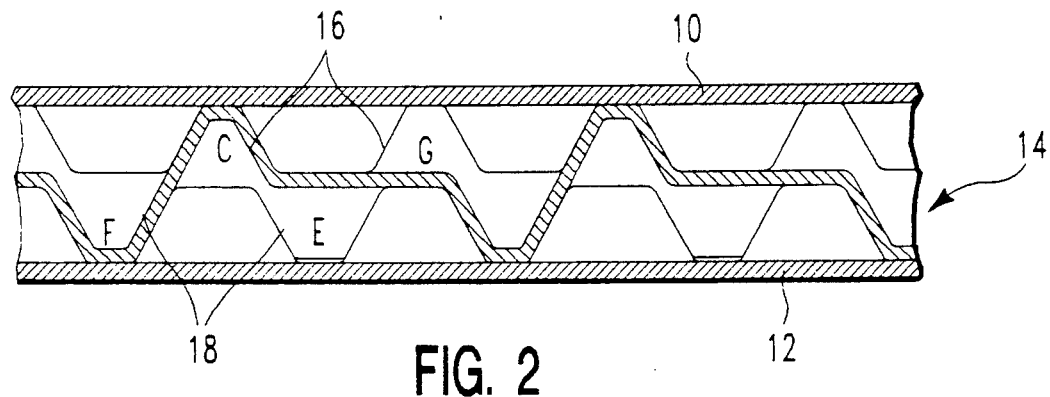
FIG. 2 is a plan view of a portion of a panel embodying the invention and having a clear top layer.
Figure 7:
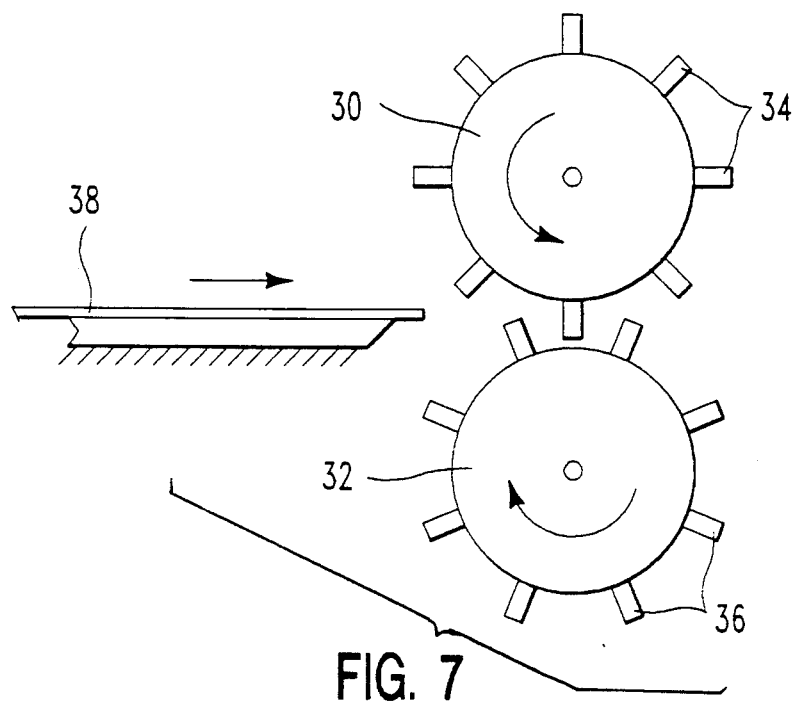
FIG. 7 is a view of the left edge of the panel of FIG. 2.

A base tetrahedron structure may be appreciated by considering FIGS. 2 and 7, wherein three upper protrusions 16 not separated by a lower protrusion 18 have been labeled A, B, and C, and interconnected in FIG. 1 with dash (---) segment lines to emphasize their triangular arrangement.

Tetrahedron structures may be seen by viewing FIGS. 2, 3, 5 and 6. Tetrahedron structures result from a protrusion on one side being positioned intermediate three protrusions on the other side, when viewed from above or below the panel of FIG. 2. Thus the upper protrusions B, C, and G, interconnected by segment lines, have intermediate them a lower protrusion E, the sides of the tetrahedron being formed by the surfaces falling to the protrusion E on the line segment of each pairing of the three upper protrusions B, C, and G. The fourth surface of the tetrahedron is formed by the portion of the panel 10 between the upper protrusions B, C, and G.

Figure 3:
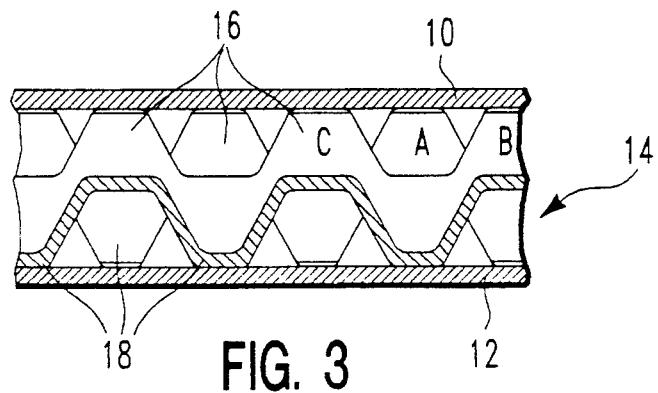
FIG. 3 is a view of the front edge of the panel of FIG. 2.
Figure 4:
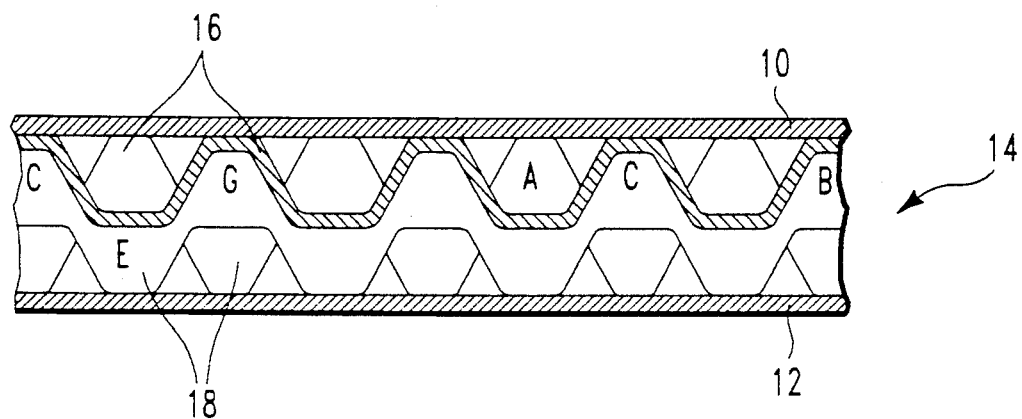
FIG. 4 is a view of the right edge of the panel of FIG. 2.
Figure 5:
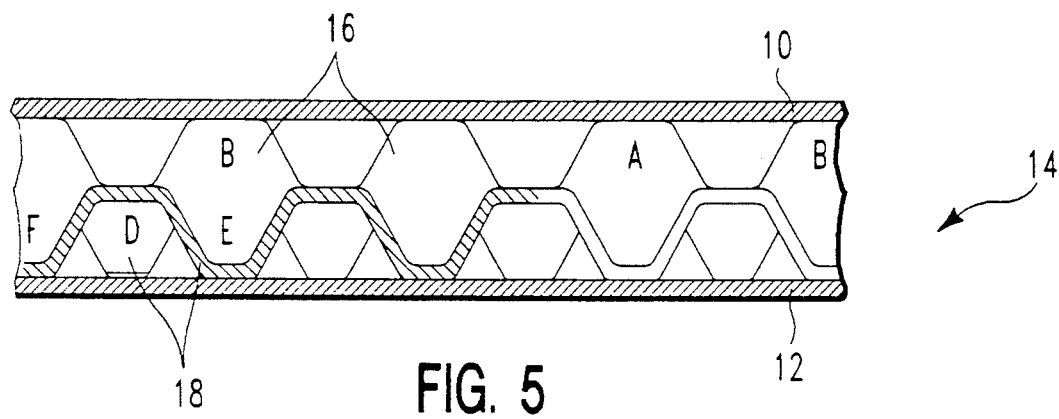
FIG. 5 is a view taken along the line 4—4 of FIG. 2.
Figure 6:
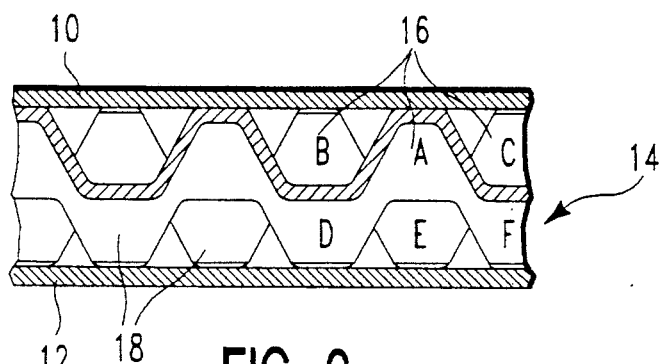
FIG. 6 is a view taken along the line 5—5 of FIG. 2.

The upper protrusions A and C and the lower protrusions F form part of an apex-adjoining tetrahedron of the same orientation. FIG. 3 shows the slope of the edge extending from upper protrusion C to lower protrusion F and formed by the intersection of the side surfaces falling from the protrusions A and C edge with the upper panel 10 and falling from the protrusion C with another protrusion (not shown) edge with the upper panel 10.

It can be appreciated from FIG. 2 that the tetrahedrons also extend in the reverse direction (inverse tetrahedrons). Thus upper protrusion G serves as the upper apex for an inverse tetrahedron whose three other or base apexes are the lower protrusions E, H, and I. Also that the regular tetrahedrons from edge-adjoining structures with their inverse neighbors. Further, that each protrusion forms part of three similarly oriented regular tetrahedrons spaced at one hundred and twenty degree (120*) angles about it. Further that a rigid matrix obtains in that octahedron structures surround the spaces between the angularly spaced regular tetrahedrons, to provide a most rigid structure capable of resisting large forces even though formed of light materials. Of course, additional strength obtains from the somewhat conical nature of the protrusions 16 and 18, conical shapes providing high strength with minimal material.

Figure 10:
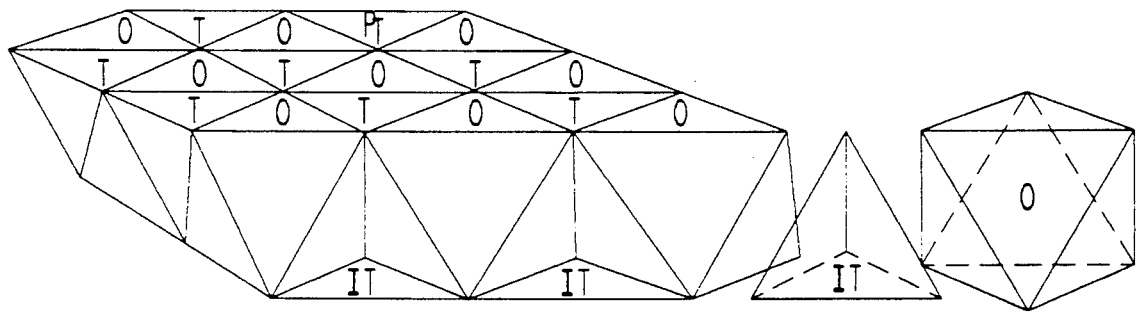
FIG. 10 is a schematic portraying tetrahedrons in a portion of the panel of FIG. 2 and some additional panel.

The tetrahedron structures of the panel in FIG. 2 are diagrammatically shown in the schematic of FIG. 10. The regular tetrahedron having apexes B, G, and C in the upper layer 10 and its fourth apex E in the lower layer 12, is shown as being abutted by three inverse tetrahedrons each sharing two apexes and their included edge in common with it. One has apexes E, H, and I in the lower layer and its fourth apex G in the upper layer. The other inverse tetrahedrons involve apexes E, F, J, and C, and E, D, K, and B. The inverse tetrahedrons are spaced from each other and on one hundred twenty degree (120*) centers about the tetrahedron B,G,C,E. The regular tetrahedron B,G,C,E shares its upper apexes with the upper apexes of six surrounding inverse tetrahedra—B,M,A,D; B,L,N,K; G,R,L,H; G,O,S,I; C,P,O,J; and C,A,Q,F. Thus a space exists between adjacent regular tetrahedra such as B,C,G,E; B,L,N,K; and G,R,L,H; which space is further defined by the inverse tetrahedra sharing the adjacent apexes B, G, and L—namely B,E,K,D; L,H,T,K; and G,I,H,E. Hence an octahedron space is enclosed having faces B,G,E; E,H,G; G,H,L; L,H,K; K,L,B; K,B,E; E,H,K; and B,G,L. Octahedrons are thus formed which maintain the associated tetrahedra in spaced and operative relationship.

The core 14 of the panel can be formed from plastic materials in various ways. Included are vacuum forming, metal stamping, cold forming of polymers, and die casting.

Figure 8:
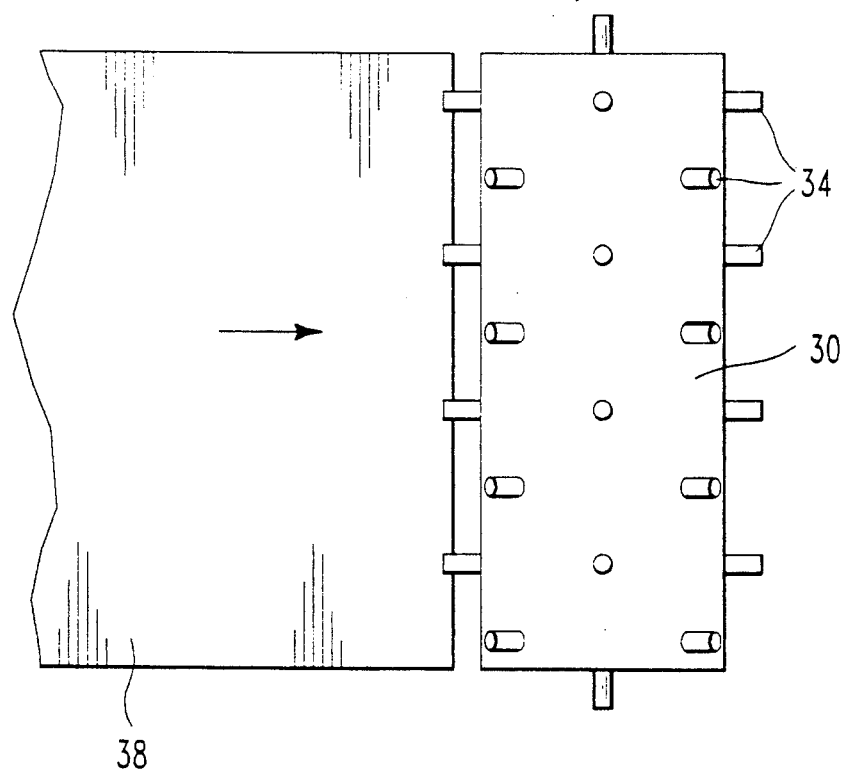
FIG. 8 is a side view of an apparatus for easily forming the core of the panel shown in the above figures.

Applicant has however devised a continuous forming apparatus and process wherein cores according to the invention can be produced at very low manufacturing cost in large volumes. FIGS. 7 and 8 show the apparatus. As best seen in FIG. 7, a pair of counter-rotating rollers, upper roller 30 and lower roller 32 connected to rotate in synchronism, have rod-like projections 34 and 36 on them equally spaced in columns extending across the width of the rollers and in rows around the rollers, the projections in adjacent columns being staggered. A thermosetting plastic sheet 38, shown here as being supported on a table 40 which may be heated to soften or to maintain soft the soft plastic sheet if it just exited from an extrusion process, is fed between the rollers whose pins now deform the soft sheet into the core shapes of FIGS. 1 to 6.

It will be evident that large amounts of sheet material may be processed to core shapes, inexpensively. It will also be evident that the lengths of the projections 34 and 36 may be varied to provide the desired strength and other qualities in a panel, and that even rollers having other diameters and numbers and spacing and shapes of projections 34 and 36 utilized. Further, that the lengths of each of the projections could be subject to computer control to allow the ready building of different panels and panels varying across their length and width and thickness. Angles and spacing may be changed to achieve desired properties, too.

Figure 14:
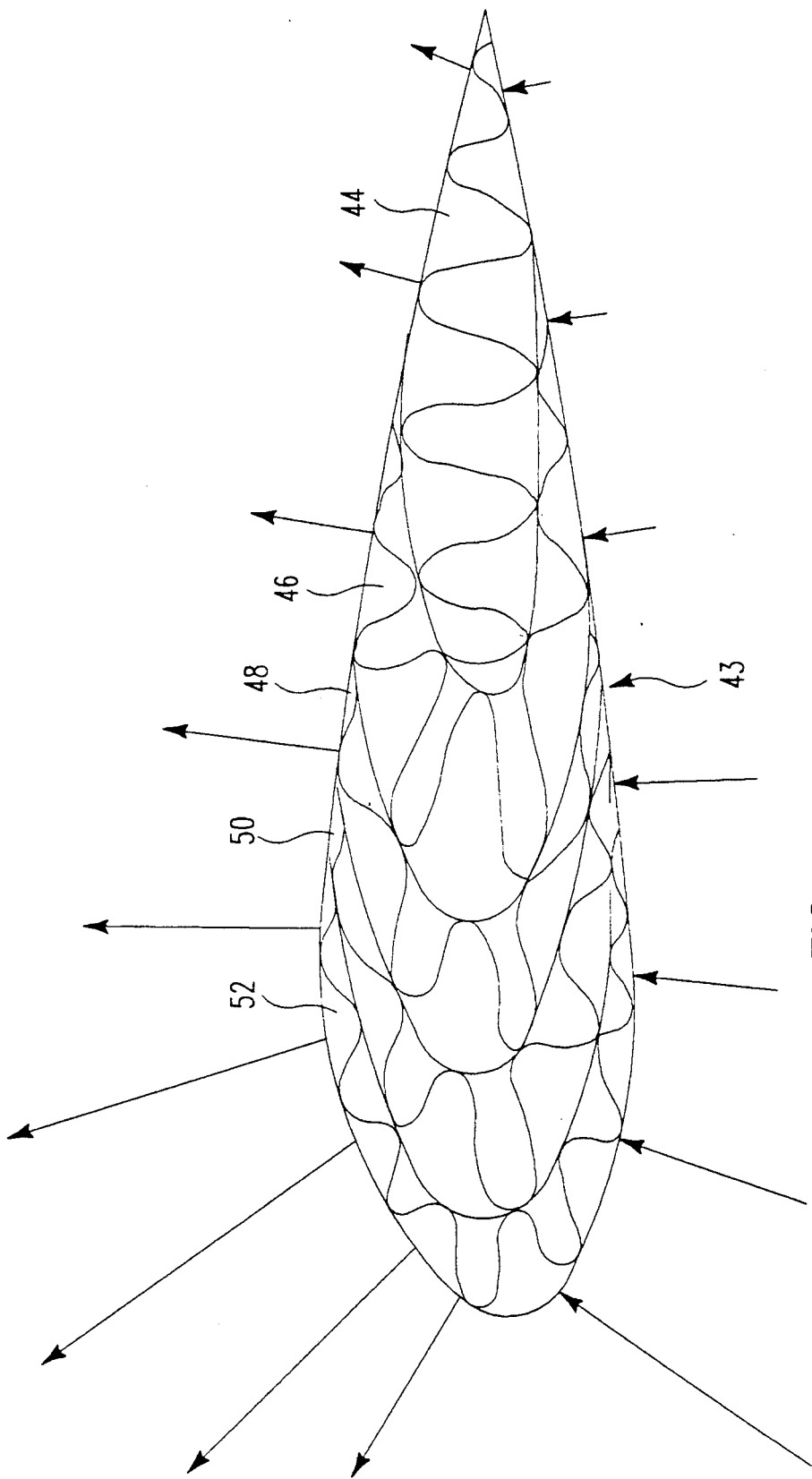
FIG. 14 is a schematic edge view of another structure, an airplane wing, in effect made up of layers of tetrahedron sandwich panels.

The applications for the tetrahedra-filled panels are numerous. For example, their strength capabilities facilitate the construction of airplane wings wherein the lengths of the tetrahedra are varied across the width and length of the wings so that the tetrahedra define the desired airfoils. As best seen in FIG. 14, a wing generally indicated by the numeral 43, of compound layers, includes a base tetrahedron panel 44 in a somewhat airfoil shape, a panel 46 of large and varying tetrahedra and somewhat U-shaped and surrounding the leading edge of the base panel 44, and tetrahedron panels 50 and 52 in front of it. Adjacent layers may be independent ones cemented together or common ones for the adjacent panels. Such a structure is light yet strong and thus accommodates the large and varying loads, in both compression and tension as shown by the arrows, placed on airplanes wings.

Figure 13:
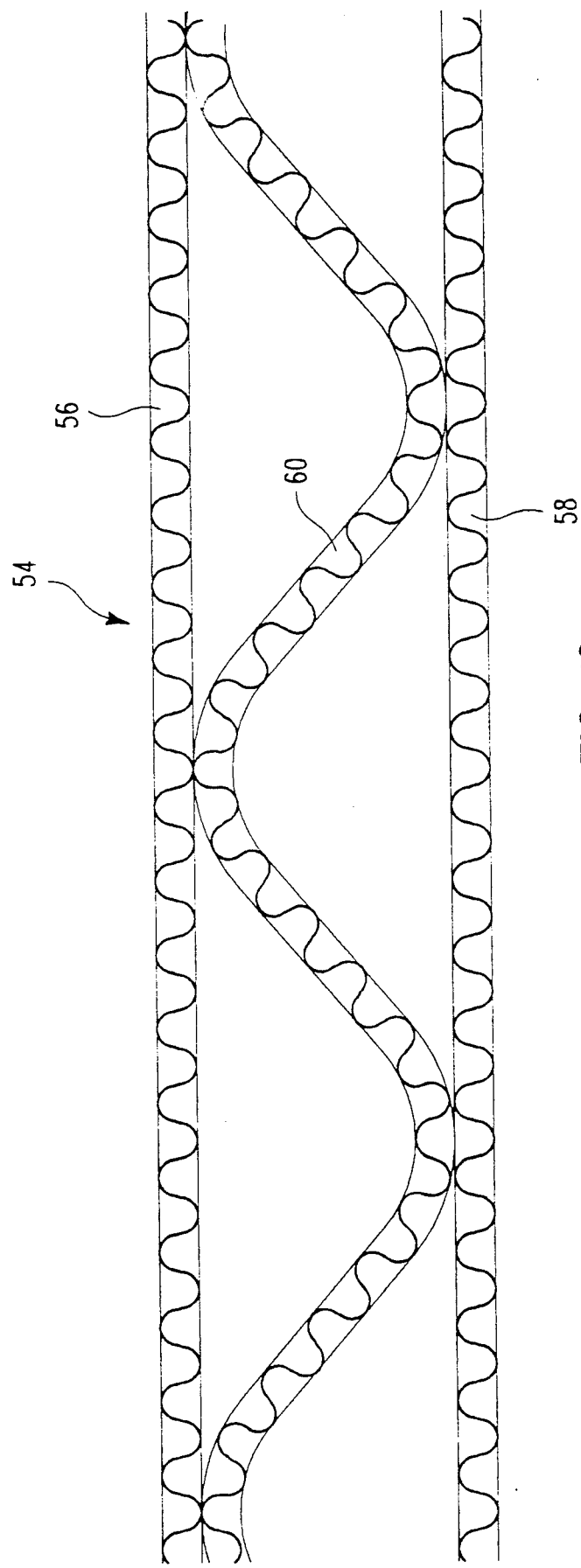
FIG. 13 is a schematic edge view of a sandwich panel made up of tetrahedron sandwich panels.

Even complex layers of panels may be built to offset different stresses. For example, FIG. 13 shows a tetrahedron sandwich panel generally indicated by the numeral 54. The panel 54 has outer layers 56 and 58 of tetrahedron sandwich panels and a core 60 of a tetrahedron sandwich panel shaped to provide tetrahedron structures.

Actually, many designs may be utilized. The frequency or density of the polyhedra may be varied. Likewise, the length and thickness and shape of the polyhedra and the width of their ends; the aspect or symmetry of the various polyhedra; as well as the characteristics of the outer layers. Moreover, the polyhedra need not have flat end faces; instead their faces may describe compound and complex curvatures. Such curvatures may conform to the shape of the outer layers; indeed the strength and rigidity of compound curvature is greater than that of flat construction. Such curvature can be easily created, particularly under computer control, and cores and panels of various configurations and structural properties produced. The choices present the designer with unprecendented flexibility and power.

Figure 11:
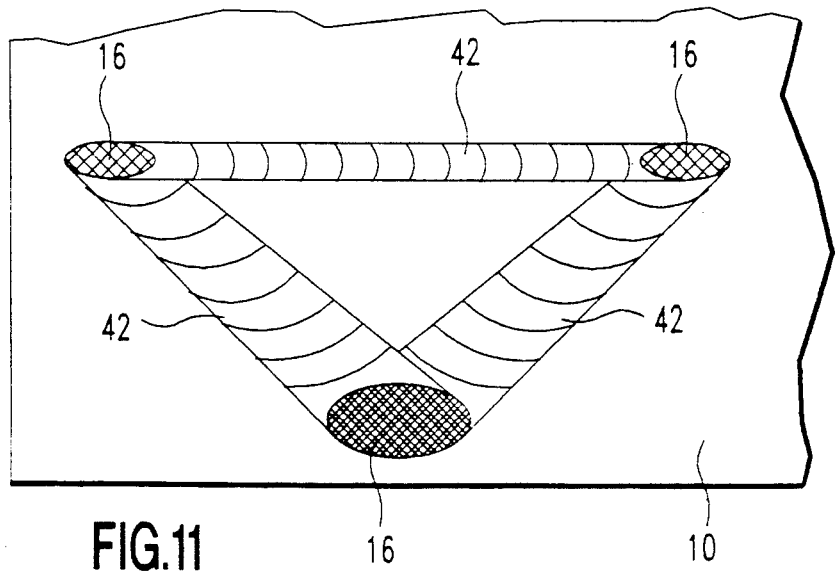
FIG. 11 is a schematic showing impressions on the underside of the FIG. 1 panel upper layer, for strengthening it.
Figure 15:
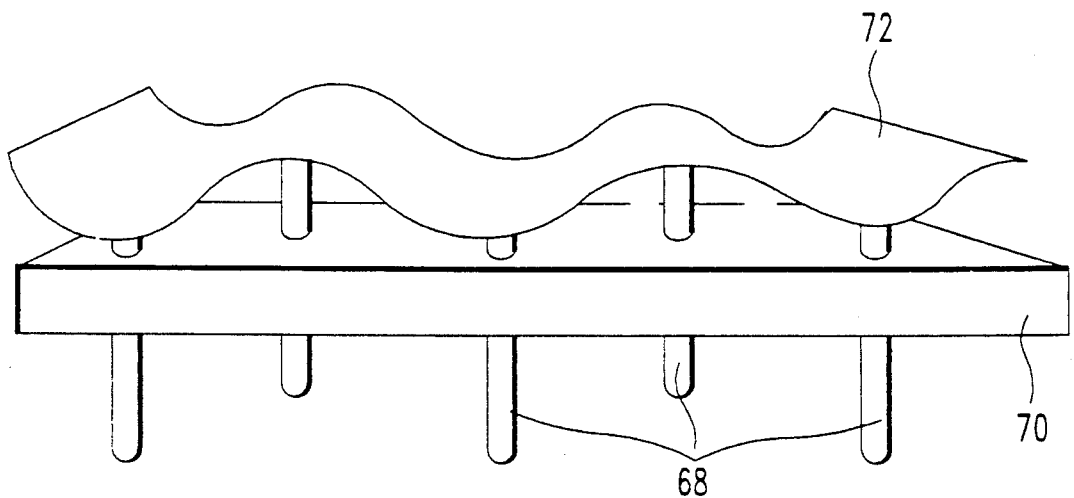
FIG. 15 is a schematic view in perspective of apparatus for easily forming non-regular tetrahedron core shapes.
Figure 12:
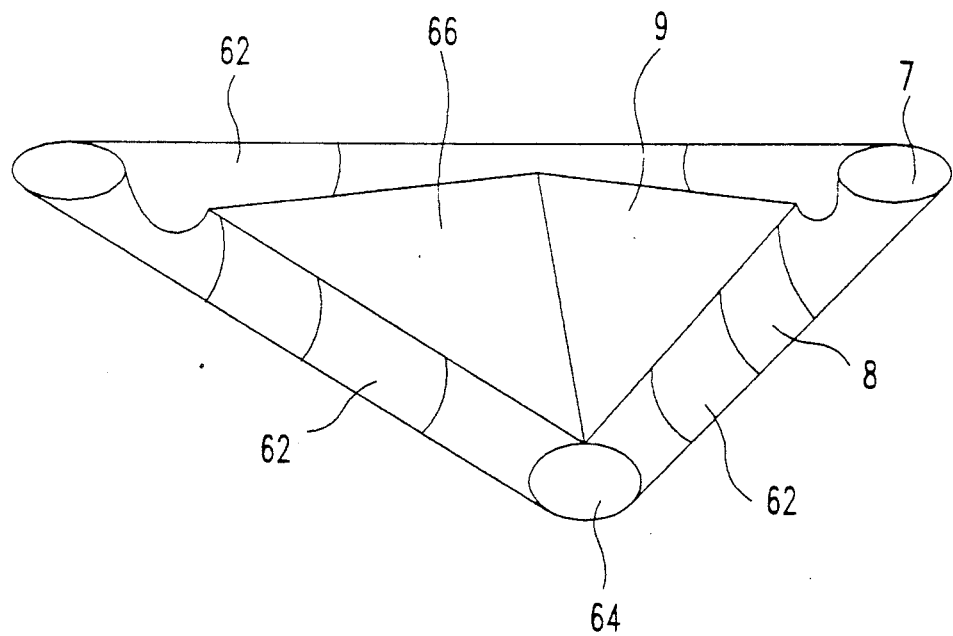
FIG. 12 is a schematic showing impressions on the upper side of a panel lower layer, for strengthening it.

Additional strength can be obtained in a panel by forming appropriate impressions upon the faces of the panel to which the core is to be cemented. As shown in FIG. 11, troughs 42 (or lands or raised triangles) on the underside of the upper layer 10 may extend between the points or apexes 16 of the tetrahedra. The troughs 42 provide increased compressive resistance between the points by approximating cylindrical struts. FIG. 12 shows a triangle of troughs 62 formed on the upperside of a lower panel 64, and sitting inside of the troughs the base of a tetrahedron 66.

Figure 9:
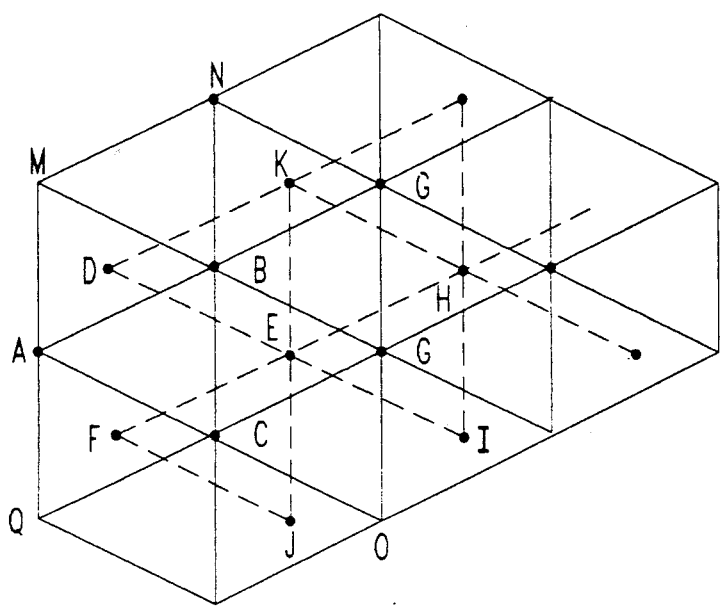
FIG. 9 is a plan view of the apparatus shown in FIG. 8.
Figure 16:
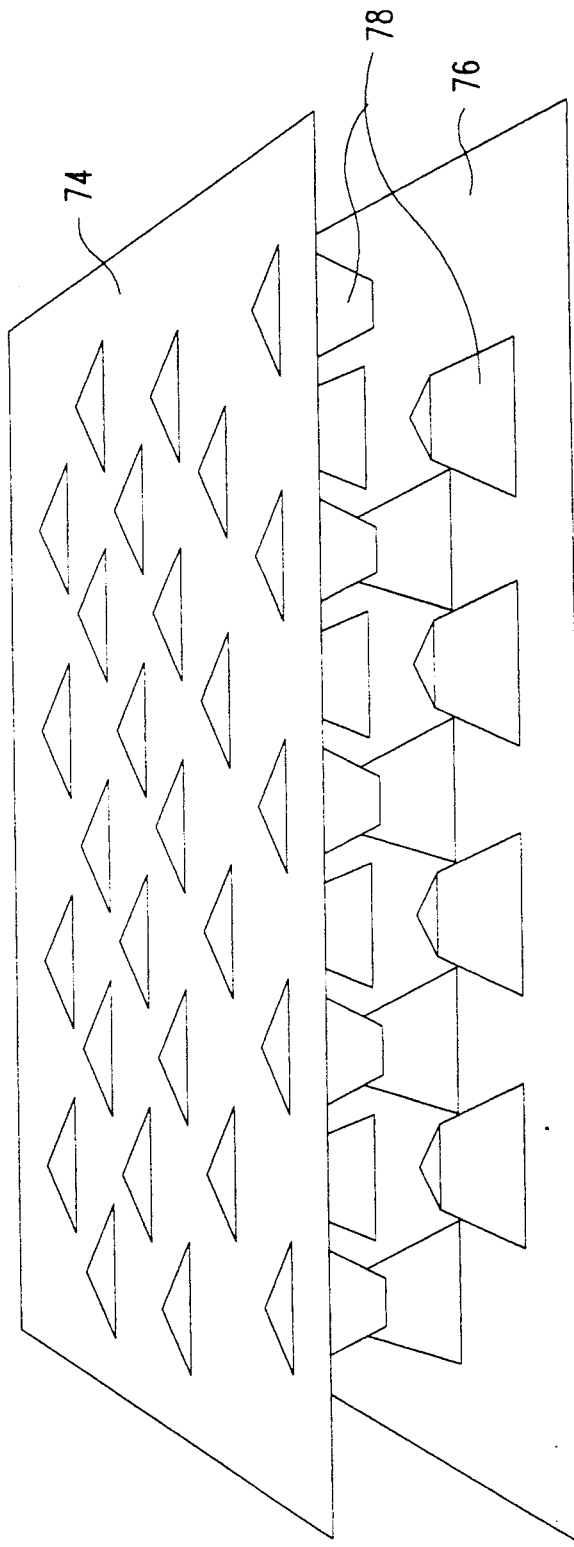
FIG. 16 is an exploded schematic view in perspective of a tetrahedron panel wherein the core is formed out of deformed tetrahedron portions of the external layers which interleave and mesh when the layers are placed together.

While FIGS. 8 and 9 show apparatus for mass producing tetrahedron cores, FIG. 16 shows apparatus for readily producing cores of varying shapes. Thus pins 68, laterally positioned to produce tetrahedron structures, may be variously positioned heightwise, including by computer control, with respect to a mounting board 70. The upper free ends of pins 68 thus define a profile which conforms to the desired shape of a side of a panel, such as that depicted by the form 72. Of course the shaped form 72 could be used to conform the location of the free ends of the pins 68. And the shape of the surface of the mounting board 70 may be made to desired panel topology. In use, plastic sheets would be placed on the pins 68, heated, and deformed as by gravity so that portions of the sheets reached the board 70 to form cores having tetrahedron structures of desired size and shapes.

It will be apparent that applicants have created a sandwich type panel in which the core is a three-dimensional deformation of a plastic sheet consisting of a rigid matrix of tetrahedrons and octahedrons providing a structural integrity inherent in the employment of omni-triangulated polyhedrons. Since the triangle is the only stable planar shape, the extensive use of the triangle through adjoining tetrahedrons, with octahedrons interplaced for maximal sharing of stress, confers great structural advantages compared to those of similarly sized rectilinear systems. Applicants have succeeded in integrating into a simply constructed sandwich panel the geometric principles so ably espoused by the late Professor Buckminster Fuller of MIT fame.

Sandwich panels embodying tetrahedron structures can even be formed from just two layers of material. Spaced tetrahedron shaped structures are formed on the inside surfaces of two potential outside layers and so that the tetrahedron structures interleave and mesh when the two layers are cemented together. As shown in FIG. 17, outside layers 74 and 76 have tetrahedron shaped structures 78 deformed from their adjacent surfaces. Cement placed on the free ends of the tetrahedron structures would hold the structures to the other layer and hence the panel together with a tetrahedron core.

It will be appreciated that while applicants have shown preferred embodiments of the invention, various changes may be made by those skilled in the art without departing from the principles of the invention. Thus it is intended that the patent be limited only by the scope or spirit of the appended claims.

What is claimed is:

1. A panel embodying tetrahedron structures, wherein the panel includes outside layers, wherein the tetrahedron structures interconnect the outside layers, wherein tetrahedron structures have their bases formed by portions of one of the panel layers, wherein the bases of the tetrahedron structures include impressions formed upon the one panel layer.

2. A panel embodying tetrahedron structures, wherein the panel includes outside layers, wherein an outside layer itself includes additional tetrahedron structures.

3. A panel embodying tetrahedron structures, wherein the panel includes outside layers, wherein the tetrahedron structures interconnect the outside layers, wherein other tetrahedron structures connect an outside layer to another layer outside of it.

* * * * *